US012322404B2

(12) United States Patent
McGrath et al.

(10) Patent No.: US 12,322,404 B2
(45) Date of Patent: Jun. 3, 2025

(54) METHODS AND DEVICES FOR ENCODING AND/OR DECODING IMMERSIVE AUDIO SIGNALS

(71) Applicants: DOLBY LABORATORIES LICENSING CORPORATION, San Francisco, CA (US); DOLBY INTERNATIONAL AB, Dublin (IE)

(72) Inventors: David S. McGrath, Rose Bay (AU); Michael Eckert, Ashfield (AU); Heiko Purnhagen, Sundbyberg (SE); Stefan Bruhn, Sollentuna (SE)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 18/349,427

(22) Filed: Jul. 10, 2023

(65) Prior Publication Data

US 2024/0005933 A1 Jan. 4, 2024

Related U.S. Application Data

(62) Division of application No. 17/251,913, filed as application No. PCT/US2019/040282 on Jul. 2, 2019, now Pat. No. 11,699,451.

(Continued)

(51) Int. Cl.
*G10L 19/16* (2013.01)
*G10L 19/008* (2013.01)
(Continued)

(52) U.S. Cl.
CPC .......... *G10L 19/167* (2013.01); *G10L 19/008* (2013.01); *G10L 19/18* (2013.01)

(58) Field of Classification Search
CPC ....... G10L 19/00; G10L 19/20; G10L 19/167; G10L 19/16; G10L 19/008; G10L 19/18;
(Continued)

(56) References Cited

U.S. PATENT DOCUMENTS 9,870,778 B2 1/2018 Peters et al.
9,942,688 B2 4/2018 Robinson et al.
(Continued)

FOREIGN PATENT DOCUMENTS

CN 105556597 A 5/2016
CN 105612577 A 5/2016
(Continued)

OTHER PUBLICATIONS

Heidi-Maria et al "Parametric Joint Channel Coding of Immersive Audio", presented at AES 142nd Convention, Berlin, Germany, May 20-23, 2017, (Year: 2017).*

(Continued)

*Primary Examiner* — Leshui Zhang

(57) ABSTRACT

The present document describes a method (700) for encoding a multi-channel input signal (201). The method (700) comprises determining (701) a plurality of downmix channel signals (203) from the multi-channel input signal (201) and performing (702) energy compaction of the plurality of downmix channel signals (203) to provide a plurality of compacted channel signals (404). Furthermore, the method (700) comprises determining (703) joint coding metadata (205) based on the plurality of compacted channel signals (404) and based on the multi-channel input signal (201), wherein the joint coding metadata (205) is such that it allows upmixing of the plurality of compacted channel signals (404) to an approximation of the multi-channel input signal (201). In addition, the method (700) comprises encoding (Continued)

(704) the plurality of compacted channel signals (404) and the joint coding metadata (205).

1 Claim, 5 Drawing Sheets

Related U.S. Application Data

(60) Provisional application No. 62/693,246, filed on Jul. 2, 2018.

(51) Int. Cl.
*G10L 19/18* (2013.01)
*H04S 3/00* (2006.01)

(58) Field of Classification Search
CPC ............. G10L 19/0018; G10L 19/0017; G10L 19/012; G10L 19/08; G10L 19/038; G10L 19/002; G10L 19/0204; H04S 3/008; H04S 3/00; H04S 3/02; H04S 3/002; H04S 3/005; H04S 7/303; H04S 2420/03; H04S 2420/11
USPC ...... 704/500–504; 381/1–23, 56, 57, 58, 61, 381/59, 62, 63, 80, 81, 82, 99, 101
See application file for complete search history.

(56) References Cited

U.S. PATENT DOCUMENTS

| | | | | |
|---|---|---|---|---|
| 2004/0032960 | A1 | 2/2004 | Griesinger | |
| 2010/0169103 | A1 | 7/2010 | Pulkki | |
| 2011/0216908 | A1 | 9/2011 | Galdo | |
| 2011/0222694 | A1 | 9/2011 | Del Galdo | |
| 2012/0057710 | A1 | 3/2012 | Disch | |
| 2012/0114126 | A1 | 5/2012 | Thiergart | |
| 2013/0114819 | A1 | 5/2013 | Melchior | |
| 2013/0142266 | A1 | 6/2013 | Ström | |
| 2014/0023196 | A1* | 1/2014 | Xiang | G10L 19/008 381/17 |
| 2014/0226823 | A1 | 8/2014 | Sen | |
| 2014/0247946 | A1* | 9/2014 | Sen | G10L 19/167 381/23 |
| 2015/0356978 | A1 | 12/2015 | Dickins | |
| 2016/0035356 | A1 | 2/2016 | Morrell | |
| 2016/0064005 | A1 | 3/2016 | Peters | |
| 2017/0011751 | A1* | 1/2017 | Fueg | H04N 21/4318 |
| 2018/0018977 | A1 | 1/2018 | Mcgrath | |

FOREIGN PATENT DOCUMENTS

| | | | |
|---|---|---|---|
| CN | 105612766 | A | 5/2016 |
| CN | 107430863 | A | 12/2017 |
| JP | 2013507664 | A | 3/2013 |
| JP | 2013528822 | A | 7/2013 |
| JP | 2017501438 | A | 1/2017 |
| RU | 2492530 | C2 | 7/2012 |
| WO | 2005081229 | A1 | 9/2005 |
| WO | 2015184316 | A1 | 12/2015 |
| WO | 2017140666 | A1 | 8/2017 |
| WO | 2019/068638 | | 4/2019 |
| WO | 2019/143867 | | 7/2019 |

OTHER PUBLICATIONS

Laitinen et al., Converting 5.1 Audio Recordings to B-Format for Directional Audio Coding Reproduction, Year 2011, p. 61-64, 2011 IEEE International Conference on Acoustics, Speech and Signal Processing (ICASSP), Finland.

Mcgrath, D. et al "Immersive Audio Coding for Virtual Reality Using a Metadata-assisted Extension of the 3GPP EVS Codec" ICASSP May 12, 2019, pp. 730-734.

Purnhagen et al., "Immersive Audio Delivery Using Joint Object coding", AES Convention, May 26, 2016, pp. 1-6, AES, France.

Rumsey, Francis "Immersive Audio: Objects, Mixing, and Rendering" J. Audio Engineering Society, vol. 64, No. 7/8, Jul./Aug. 2016.

Dolby Laboratories, Inc., Dolby VRStream audio profile candidate—Description of Bitstream, Decoder, and Renderer plus informative Encoder Description, 3GPP, Jul. 9-13, 2018, 50 pages.

Norling, Kristofer, et al., AC-4—The Next Generation Audio Codec, Audio Engineering Society Convention 140, Jun. 4-7, 2016, 10 pages.

Anonymous: "Dolby AC-4: Audio Delivery for Next-Generation Entertainment Services" Jun. 1, 2015, pp. 7-8, 18-2.

* cited by examiner

METHODS AND DEVICES FOR ENCODING AND/OR DECODING IMMERSIVE AUDIO SIGNALS

CROSS-REFERENCE TO RELATED APPLICATIONS

This application is a divisional of U.S. application Ser. No. 17/251,913, filed 14 Dec. 2020, which is a National Phase entry of PCT Patent Application No. PCT/US2019/040282, filed 2 Jul. 2019, which claims the benefit of priority to U.S. Provisional Patent Application No. 62/693,246 filed on 2 Jul. 2018, each of which is hereby incorporated by reference in its entirety.

TECHNICAL FIELD

The present document relates to immersive audio signals which may comprise soundfield representation signals, notably ambisonics signals. In particular, the present document relates to providing an encoder and a corresponding decoder, which enable immersive audio signals to be transmitted and/or stored in a bit-rate efficient manner and/or at high perceptual quality.

BACKGROUND

The sound or soundfield within the listening environment of a listener that is placed at a listening position may be described using an ambisonics signal. The ambisonics signal may be viewed as a multi-channel audio signal, with each channel corresponding to a particular directivity pattern of the soundfield at the listening position of the listener. An ambisonics signal may be described using a three-dimensional (3D) cartesian coordinate system, with the origin of the coordinate system corresponding to the listening position, the x-axis pointing to the front, the y-axis pointing to the left and the z-axis pointing up.

By increasing the number of audio signals or channels and by increasing the number of corresponding directivity patterns (and corresponding panning functions), the precision with which a soundfield is described may be increased. By way of example, a first order ambisonics signal comprises 4 channels or waveforms, namely a W channel indicating an omnidirectional component of the soundfield, an X channel describing the soundfield with a dipole directivity pattern corresponding to the x-axis, a Y channel describing the soundfield with a dipole directivity pattern corresponding to the y-axis, and a Z channel describing the soundfield with a dipole directivity pattern corresponding to the z-axis. A second order ambisonics signal comprises 9 channels including the 4 channels of the first order ambisonics signal (also referred to as the B-format) plus 5 additional channels for different directivity patterns. In general, an L-order ambisonics signal comprises $(L+1)^2$ channels including the $L^2$ channels of the (L−1)-order ambisonics signals plus $[(L+1)^2-L^2]$ additional channels for additional directivity patterns (when using a 3D ambisonics format). L-order ambisonics signals for L>1 may be referred to as higher order ambisonics (HOA) signals.

An HOA signal may be used to describe a 3D soundfield independently from an arrangement of speakers, which is used for rendering the HOA signal. Example arrangements of speakers comprise headphones or one or more arrangements of loudspeakers or a virtual reality rendering environment. Hence, it may be beneficial to provide an HOA signal to an audio render, in order to allow the audio render to flexibly adapt to different arrangements of speakers.

Soundfield representation (SR) signals, such as ambisonics signals, may be complemented with audio objects and/or multi-channel (bed) signals, to provide an immersive audio (IA) signal. The present document addresses the technical problem of transmitting and/or storing IA signals, with high perceptual quality in a bandwidth efficient manner. The technical problem is solved by the independent claims. Preferred examples are described in the dependent claims.

SUMMARY

According to an aspect, a method for encoding a multi-channel input signal is described. The multi-channel input signal may be part of an immersive audio (IA) signal. The multi-channel input signal may comprise a soundfield representation (SR) signal, notably a first or higher order ambisonics signal. The method comprises determining a plurality of downmix channel signals from the multi-channel input signal. Furthermore, the method comprises performing energy compaction of the plurality of downmix channel signals to provide a plurality of compacted channel signals. In addition, the method comprises determining joint coding metadata (notably Spatial Audio Resolution Reconstruction, SPAR, metadata) based on the plurality of compacted channel signals and based on the multi-channel input signal, wherein the joint coding metadata is such that it allows upmixing of the plurality of compacted channel signals to an approximation of the multi-channel input signal. The method further comprises encoding the plurality of compacted channel signals and the joint coding metadata.

According to a further aspect, a method for determining a reconstructed multi-channel signal from coded audio data indicative of a plurality of reconstructed channel signals and from coded metadata indicative of joint coding metadata is described. The method comprises decoding the coded audio data to provide the plurality of reconstructed channel signals and decoding the coded metadata to provide the joint coding metadata. Furthermore, the method comprises determining the reconstructed multi-channel signal from the plurality of reconstructed channel signals using the joint coding metadata.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to another aspect, an encoding unit or encoding device for encoding a multi-channel input signal and/or an immersive audio (IA) signal is described. The encoding unit is configured to determine a plurality of downmix channel signals from the multi-channel input signal. Furthermore, the encoding unit is configured to perform energy compaction of the plurality of downmix channel signals to provide a plurality of compacted channel signals. In addition, the encoding unit is configured to determine joint coding metadata based on the plurality of compacted channel signals and based on the multi-channel input signal, wherein the joint coding metadata is such that it allows upmixing of the plurality of compacted channel signals to an approximation of the multi-channel input signal. The encoding unit is further configured to encode the plurality of compacted channel signals and the joint coding metadata.

According to another aspect, a decoding unit or decoding device for determining a reconstructed multi-channel signal from coded audio data indicative of a plurality of reconstructed channel signals and from coded metadata indicative of joint coding metadata is described. The decoding unit is configured to decode the coded audio data to provide the plurality of reconstructed channel signals and to decode the coded metadata to provide the joint coding metadata. Furthermore, the decoding unit is configured to determine the reconstructed multi-channel signal from the plurality of reconstructed channel signals using the joint coding metadata.

It should be noted that the methods, devices and systems including its preferred embodiments as outlined in the present patent application may be used stand-alone or in combination with the other methods, devices and systems disclosed in this document. Furthermore, all aspects of the methods, devices and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows an example coding system;

DETAILED DESCRIPTION

As outlined above, the present document relates to an efficient coding of immersive audio (IA) signals such as First order ambisonics (FOA) or HOA signals, multi-channel and/or object audio signals, wherein notably FOA or HOA signals are referred to herein more generally as soundfield representation (SR) signals.

As outlined in the introductory section, an SR signal may comprise a relatively high number of channels or waveforms, wherein the different channels relate to different panning functions and/or to different directivity patterns. By way of example, an $L^{th}$-order 3D FOA or HOA signal comprises $(L+1)^2$ channels. An SR signal may be represented in various different formats.

A soundfield may be viewed as being composed of one or more sonic events emanating from arbitrary directions around the listening position. By consequence the locations of the one or more sonic events may be defined on the surface of a sphere (with the listening or reference position being at the center of the sphere).

A soundfield format such as FOA or Higher Order Ambisonics (HOA) is defined in a way to allow the soundfield to be rendered over arbitrary speaker arrangements (i.e. arbitrary rendering systems). However, rendering systems (such as the Dolby Atmos system) are typically constrained in the sense that the possible elevations of the speakers are fixed to a defined number of planes (e.g. an ear-height (horizontal) plane, a ceiling or upper plane and/or a floor or lower plane). Hence, the notion of an ideal spherical soundfield may be modified to a soundfield which is composed of sonic objects that are located in different rings at various heights on the surface of a sphere (similar to the stacked-rings that make up a beehive).

Figure 1:
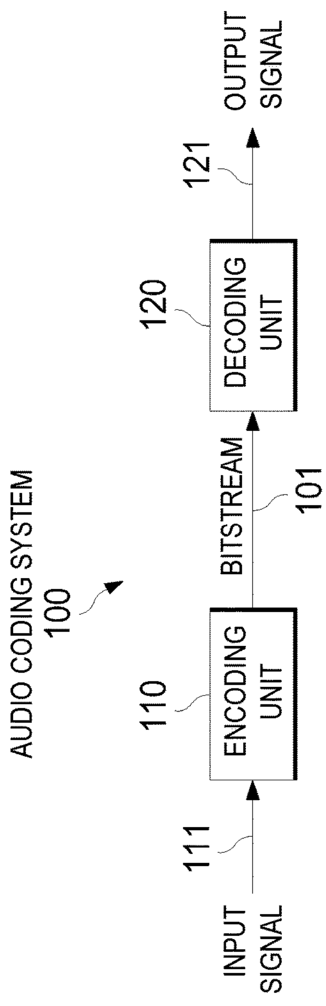

As shown in FIG. 1, an audio coding system 100 comprises an encoding unit 110 and a decoding unit 120. The encoding unit 110 may be configured to generate a bitstream 101 for transmission to the decoding unit 120 based on an input signal 111, wherein the input signal 111 may comprise an immersive audio signal (used e.g. for Virtual Reality (VR) applications). The immersive audio signal may comprise an SR signal, a multi-channel (bed) signals and/or a plurality of objects (each object comprising an object signal and object metadata). The decoding unit 120 may be configured to provide an output signal 121 based on the bitstream 101, wherein the output signal 121 may comprise a reconstructed immersive audio signal.

Figure 2:
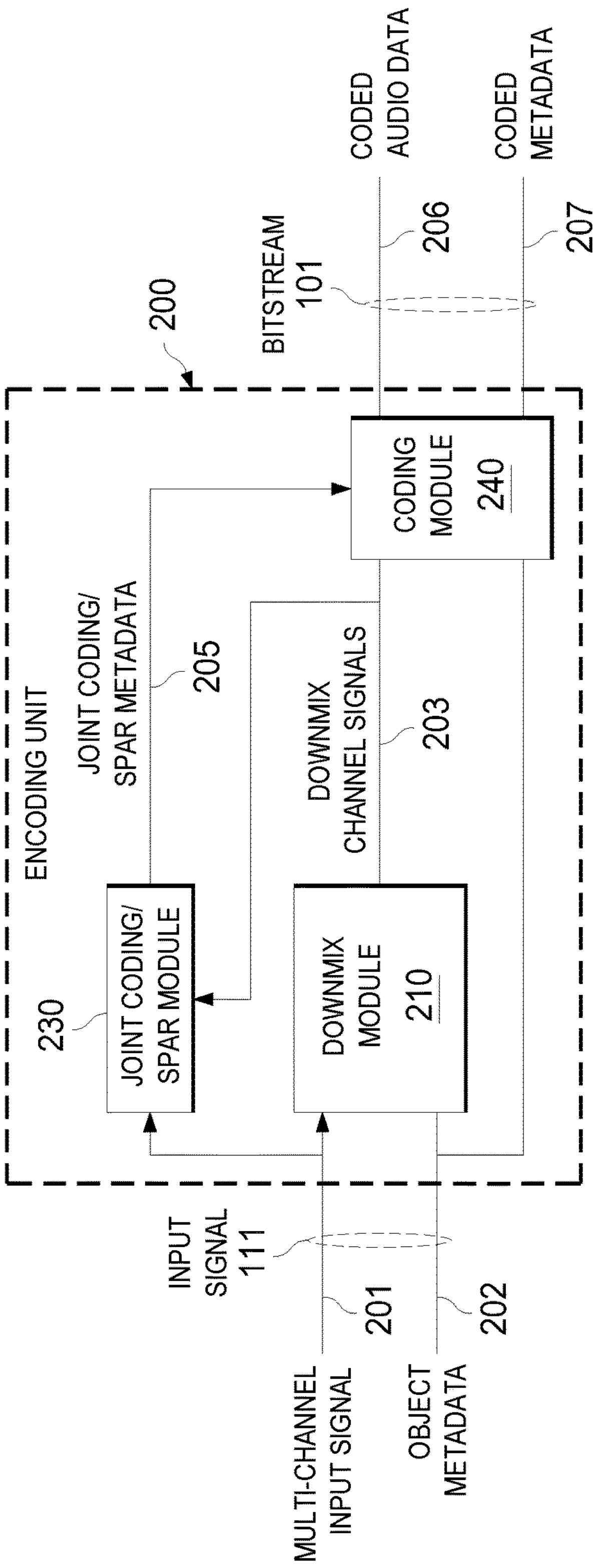
FIG. 2 shows an example encoding unit for encoding an immersive audio signal.

FIG. 2 illustrates an example encoding unit 110, 200. The encoding unit 200 may be configured to encode an input signal 111, where the input signal 111 may be an immersive audio (IA) input signal 111. The IA input signal 111 may comprise a multi-channel input signal 201. The multi-channel input signal 201 may comprise an SR signal and one or more object signals. Furthermore, object metadata 202 for the plurality of object signals may be provided as part of the IA input signal 111. The IA input signal 111 may be provided by a content ingestion engine, wherein a content ingestion engine may be configured to derive objects and/or SR signals from (complex) VR content.

The encoding unit 200 comprises a downmix module 210 configured to downmix the multi-channel input signal 201 to a plurality of downmix channel signals 203. The plurality of downmix channel signals 203 may correspond to an SR signal, notably to a first order ambisonics (FOA) signal. Downmixing may be performed in the subband domain or QMF domain (e.g. using 10 or more subbands).

The encoding unit 200 further comprises a joint coding module 230 (notably a SPAR module), which is configured to determine joint coding metadata 205 (notably SPAR, Spatial Audio Resolution Reconstruction, metadata) that is configured to reconstruct the multi-channel input signal 201 from the plurality of downmix channel signals 203. The joint coding module 230 may be configured to determine the joint coding metadata 205 in the subband domain.

For determining the joint coding metadata 205, the plurality of downmix channel signals 203 may be transformed into the subband domain and/or may be processed within the subband domain. Furthermore, the multi-channel input signal 201 may be transformed into the subband domain. Subsequently, joint coding metadata 205 may be determined on a per subband basis, notably such that by upmixing a subband signal of the plurality of downmix channel signals 203 using the joint coding metadata 205, an approximation of a subband signal of the multi-channel input signal 201 is obtained. The joint coding metadata 205 for the different subbands may be inserted into the bitstream 101 for transmission to the corresponding decoding unit 120.

In addition, the encoding unit 200 may comprise a coding module 240 which is configured to perform waveform encoding of the plurality of downmix channel signals 203, thereby providing coded audio data 206. Each of the downmix channel signals 203 may be encoded using a mono waveform encoder (e.g. 3GPP EVS encoding), thereby enabling an efficient encoding. Further examples for encoding the plurality of downmix channel signals 203 are MPEG AAC, MPEG HE-AAC and other MPEG Audio codecs, 3GPP codecs, Dolby Digital/Dolby Digital Plus (AC-3, eAC-3), Opus, LC-3 and similar codecs. As a further example, coding tools comprised in the AC-4 codec may also be configured to perform the operations of the encoding unit 200.

Furthermore, the coding module 240 may be configured to perform entropy encoding of the joint coding metadata (i.e. the SPAR metadata) 205 and of the object metadata 202, thereby providing coded metadata 207. The coded audio data 206 and the coded metadata 207 may be inserted into the bitstream 101.

Figure 3:
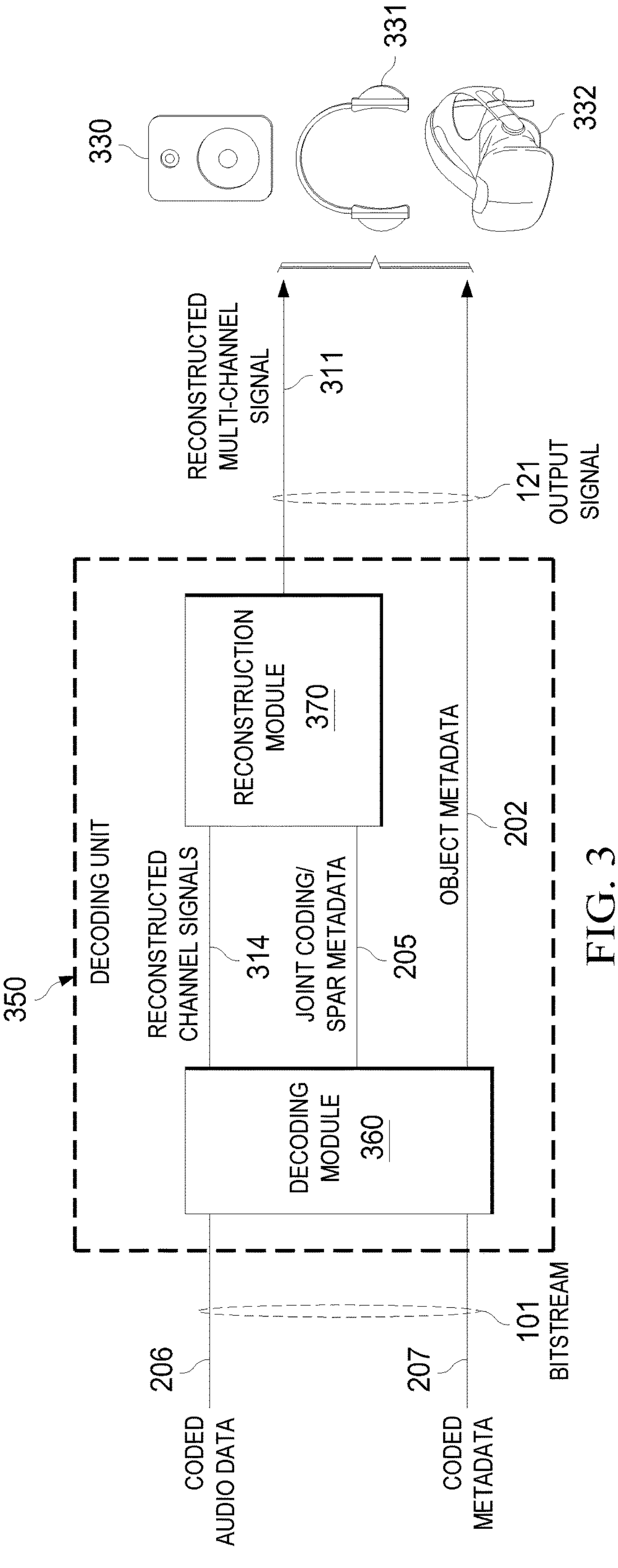
FIG. 3 shows another example decoding unit for decoding an immersive audio signal.

FIG. 3 shows an example decoding unit 120, 350. The decoding unit 120, 350 may include a receiver that receives the bitstream 101 which may include the coded audio data 206 and the coded metadata 207. The decoding unit 120, 350 may include a processor and/or de-multiplexer that demultiplexes the coded audio data 206 and the coded metadata 207 from the bitstream 101. The decoding unit 350 comprises a decoding module 360 which is configured to derive a plurality of reconstructed channel signals 314 from the coded audio data 206. The decoding module 360 may further be configured to derive the joint coding metadata 205 and the object metadata 202 from the coded metadata 207.

In addition, the decoding unit 350 comprises a reconstruction module 370 which is configured to derive a reconstructed multi-channel signal 311 from the joint coding metadata 205 and from the plurality of reconstructed channel signals 314. The joint coding metadata 205 may convey the time- and/or frequency-varying elements of an upmix matrix that allows reconstructing the multi-channel signal 311 from the plurality of reconstructed channel signals 314. The upmix process may be carried out in the QMF (Quadrature Mirror Filter) subband domain. Alternatively, another time/frequency transform, notably a FFT (Fast Fourier Transform)-based transform, may be used to perform the upmix process. In general, a transform may be applied, which enables a frequency-selective analysis and (upmix-) processing. The upmix process may also include decorrelators that enable an improved reconstruction of the covariance of the reconstructed multi-channel signal 311, wherein the decorrelators may be controlled by additional joint coding metadata 205.

The reconstructed multi-channel signal 311 may comprise a signal known as a reconstructed SR signal and one or more reconstructed object signals. The reconstructed multi-channel signal 311 and the object metadata may form a reconstructed IA signal 121. The reconstructed IA signal 121 may be used for speaker rendering 330, for headphone rendering 331 and/or for SR rendering 332.

Figure 4:
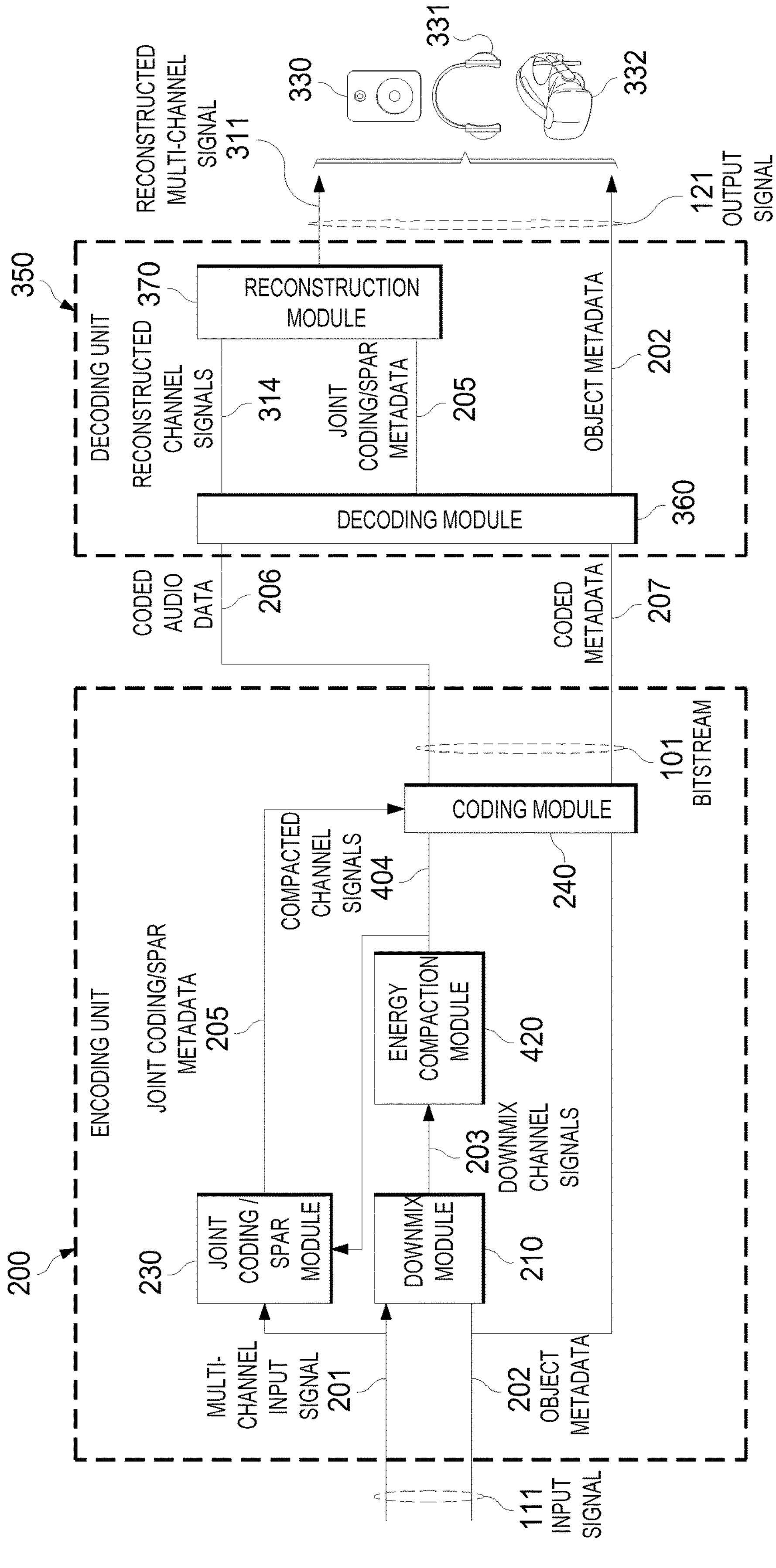
FIG. 4 shows an example encoding unit and decoding unit for encoding and decoding an immersive audio signal.

FIG. 4 illustrates an encoding unit 200 and a decoding unit 350. The encoding unit 200 comprises the components described in the context of FIG. 2. Furthermore, the encoding unit 200 comprises an energy compaction module 420 which is configured to concentrate the energy of the plurality of downmix channel signals 203 to one or more downmix channel signals 203. The energy compaction module 420 may transform the downmix channel signals 203 to provide a plurality of compacted channel signals 404. The transformation may be performed such that one or more of the compacted channel signals 404 have less energy than the corresponding one or more downmix channel signals 203.

By way of example, the plurality of downmix channel signals 203 may comprise a W channel signal, a X channel signal, a Y channel signal and a Z channel signal. The plurality of compacted channel signals 404 may comprise the W channel signal, a X' channel signal, a Y' channel signal and a Z' channel signal. The X' channel signal, the Y' channel signal and the Z' channel signal may be determined such that the X' channel signal has less energy than the X channel signal, such that the Y' channel signal has less energy than the Y channel signal and/or such that the Z' channel signal has less energy than the Z channel signal.

The energy compaction module 420 may be configured to perform energy compaction using a prediction operation. In particular, a first subset of the plurality of downmix channel signals 203 (e.g. the X channel signal, the Y channel signal and the Z channel signal) may be predicted from a second subset of the plurality of downmix channel signals 203 (e.g. the W channel signal). Energy compaction may comprise subtracting a scaled version of one of the downmix channel signals 203 (e.g. the W channel signal) from the other downmix channel signals 203 (e.g. the X channel signal, the Y channel signal and/or the Z channel signal). The scaling factor may be determined such that the energy of the other downmix channel signals 203 is reduced, notably minimized.

By performing energy compaction, the efficiency for encoding the plurality of compacted channel signal 404 may be increased compared to the encoding of the plurality of downmix channel signals 203. The encoding unit 200 is configured to implicitly insert the metadata for performing the inverse of the energy compaction operation into the joint coding metadata 205. As a result of this, an efficient encoding of as IA input signal 111 is achieved.

Figure 6:
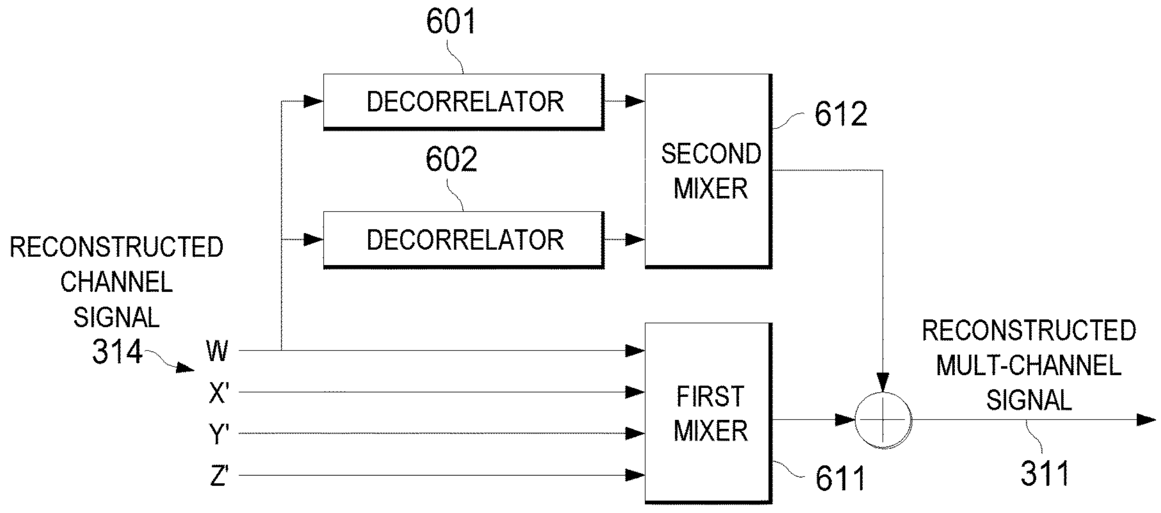
FIG. 6 shows an example reconstruction module.

As outlined above, the decoding unit comprises a reconstruction module 370. FIG. 6 illustrates an example reconstruction module 370. The reconstruction module 370 takes as input the plurality of reconstructed channel signals 314 (which may e.g. form a first order ambisonics signal). A first mixer 611 may be configured to upmix the plurality of reconstructed channel signals 314 (e.g. the four channel signals) to an increased number of signals (e.g. eleven signals, representing a $2^{nd}$ order ambisonics signal and two object signals). The first mixer 611 depends on the joint coding metadata 205.

The reconstruction module 370 may comprise decorrelators 601, 602 which are configured to produce two signals from the W channel signal that are processed in a second mixer 612 to produce an increased number of signals (e.g. eleven signals). The second mixer 612 depends on the joint coding metadata 205. The output of the first mixer 611 and the output of the second mixer 612 are summed to provide the reconstructed multi-channel signal 311.

As indicated above, the joint coding or SPAR metadata 205 may be composed of data that represents the coefficients of upmixing matrices used by the first mixer 611 and by the second mixer 612. The mixers 611, 612 may operate in the subband domain (notably in the QMF domain). In this case, the joint coding or SPAR metadata 205 comprises data that represents the coefficients of upmixing matrices used by the first mixer 611 and by the second mixer 612 for a plurality of different subbands (e.g. 10 or more subbands).

Figure 5:
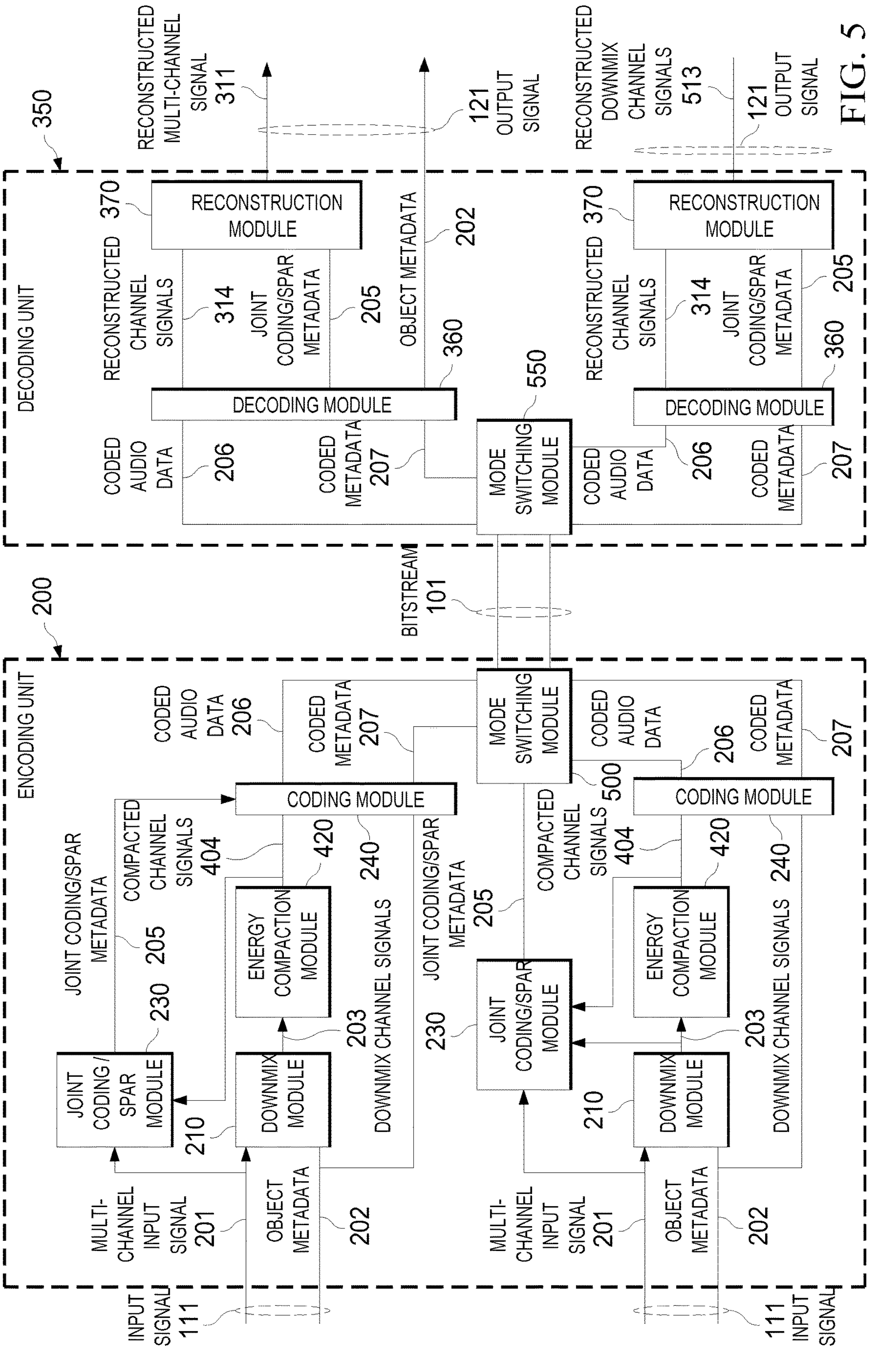
FIG. 5 shows an example encoding unit and decoding unit with mode switching.

FIG. 5 shows an encoding unit 200 which comprises two branches for encoding a multi-channel input signal 201 and for encoding object metadata 202 (which form an IA input signal 111). The upper branch corresponds to the encoding scheme described in the context of FIG. 4. In the lower branch, the joint coding unit 230 is modified to determine metadata 205 which allows the plurality of downmix channel signals 203 to be reconstructed from the plurality of compacted channel signals 404. Hence, the metadata 205 is indicative of the predictor (notably the one or more scaling factors) which has been used to generate the plurality of compacted channel signals 404 from the plurality of downmix channel signals 203. In a variant, the metadata 205 may be provided directly from the energy compaction module 220 (without the need of using the joint coding module 230).

The encoding unit 200 of FIG. 5 comprises a mode switching module 500 which is configured to switch between a first mode (corresponding to the upper branch) and a second mode (corresponding to the lower branch). The first mode may be used for providing a high perceptual quality at an increased bit-rate, and the second mode may be used for providing a reduced perceptual quality at a reduced bit-rate. The mode switching module 500 may be configured to switch between the first mode and the second mode in dependence of the status of a transmission network.

Furthermore, FIG. 5 shows a corresponding decoding unit 350 which is configured to perform decoding according to a first mode (upper branch) and according to a second mode (lower branch). A mode switching module 550 may be configured to determine which mode has been used by the encoding unit 200 (e.g. on a frame-by-frame basis). If the first mode has been used, then the reconstructed multi-channel signal 311 and object metadata 202 may be determined (as outlined in the context of FIG. 4). On the other hand, if the second mode has been used, then a plurality of reconstructed downmix channel signals 513 (corresponding to the plurality of downmix channel signals 203) may be determined by the decoding unit 350.

Hence, an encoding unit 200 is described, which comprises a downmix module 210 which is configured to processes the objects and an HOA input signal 111 to produce an output signal 203 having a reduced number of channels, for example a First Order Ambisonics (FOA) signal. The SPAR encoding module 230 generates metadata (i.e. SPAR metadata) 205 that indicates how the original inputs 111, 201 (e.g. object signals plus HOA) may be regenerated from the FOA signal 203. A set of EVS encoders 240 may take the 4-channel FOA signal 203 and may create encoded audio data 206 to be inserted into a bitstream 101, which is then decoded by a set of EVS decoders 360 to create a four-channel FOA signal 314. The SPAR metadata 205 may be provided as (entropy) encoded metadata 207 within the bitstream 101 to the decoder 360. The reconstruction module 370 subsequently regenerates an output 121 consisting of audio objects and an HOA signal.

The low resolution signal 203 generated by the downmix module 210 may be modified by a WXYZ energy compaction Transform (in module 420), which produces an output signal 404 that has less inter-channel correlation, compared to the output of the downmix module 210.

The purpose of the energy compaction filter 420 is to reduce the energy in the XYZ channels so that the W channel can be encoded at a higher bit-rate and the low energy X'Y'Z' channels can be encoded at lower bit rates. The coding artefacts are more effectively masked by doing this, so audio quality is improved.

In addition, or alternative to performing prediction, energy compaction may make use of a Karhonen Loeve Transform (KLT), a Principle Components Analysis (PCA) transform, and/or a Singular Value Decomposition (SVD) transform. In particular, an energy compaction filter 420 may be used which comprises a whitening filter, a KLT, a PCA transform and/or an SVD transform. The whitening filter may be implemented using the above mentioned prediction scheme. In particular, the energy compaction filter 420 may comprise a combination of a whitening filter and a KLT, PCA and/or SVD transform, wherein the latter one is arranged in series with the whitening filter. The KLT, PCA and/or SVD transform may be applied to the X, Y, Z channels, notably to the prediction residuals.

Figure 7:
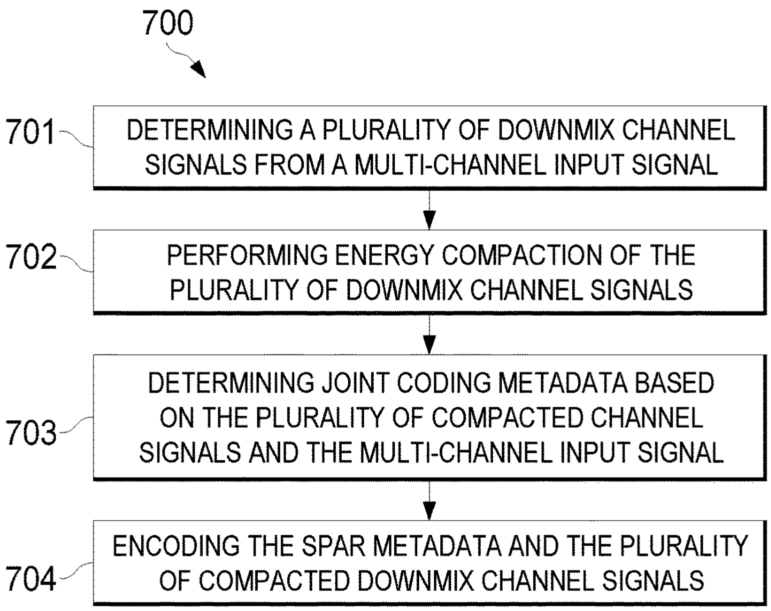
FIG. 7 shows a flow chart of an example method for encoding an immersive audio signal.

FIG. 7 shows a flow chart of an example method 700 for encoding a multi-channel input signal 201. In particular, the method 700 is directed at encoding an IA signal which comprises a multi-channel input signal 201. The multi-channel input signal 201 may comprise a soundfield representation (SR) signal. In particular, the multi-channel input signal 201 may comprise a combination of an SR signal (e.g. an HOA signal, notably a second order ambisonics signal) and one or more (notably two) object signals of one or more audio objects 303.

The method 700 comprises determining 701 a plurality of downmix channel signals 203 from the multi-channel input signal 201. The plurality of downmix channel signals 203 may comprise a reduced number of channels compared to the multi-channel input signal 201. As indicated above, the multi-channel input signal 201 may comprise an SR signal, notably a $L^{th}$ order ambisonics signal, with $L \geq 1$, and one or more object signals of one or more audio objects 303. The plurality of downmix channel signals 203 may be determined by downmixing the multi-channel input signal 201 to an SR signal, notably a $K^{th}$ order ambisonics signal, with $L \geq K$. Hence, the plurality of downmix channel signals 203 may be an SR signal, notably a $K^{th}$ order ambisonics signal.

In particular, determining 701 the plurality of downmix channel signals 203 may comprise mixing the one or more object signals of one or more audio objects 303 (of the multi-channel input signal 201) to the SR signal of the multi-channel input signal 201 (or to a downmixed version of the SR signal). The mixing (notably the panning) may be performed in dependence of the object metadata 202 of the one or more audio objects 303, wherein the object metadata 202 of an audio object 303 is indicative of a spatial position of the audio object 303. Downmixing the SR signal may comprise removing the $[(L+1)^2-L^2]$ additional channels from an $L^{th}$ order SR signal, thereby providing an $(L-1)^{th}$ order SR signal.

In a preferred example, the plurality of downmix channel signals 203 form a first order ambisonics signal, notably in a B-format or in an A-format. The SR signal of the multi-channel input signal 201 may be a second order (or higher) ambisonics signal.

Furthermore, the method 700 comprises performing 702 energy compaction of the plurality of downmix channel signals 203 to provide a plurality of compacted channel signals 404. The number of channels of the plurality of downmix channel signals 203 and the plurality of compacted channel signals 404 may be the same. In particular, the plurality of compacted channel signals 404 may form or may be in a format of a first order ambisonics signal, notably in a B-format or in an A-format.

Energy compaction may be performed such that the inter-channel correlation between the different channel signals 203 is reduced. In particular, the plurality of compacted channel signals 404 may exhibit less inter-channel correlation than the plurality of downmix channel signals 203. Alternatively, or in addition, energy compaction may be performed such that the energy of a compacted channel signal is lower than or equal to the energy of a corresponding downmix channel signal. This condition may be met for each channel.

Performing 702 energy compaction may comprise predicting a first downmix channel signal 203 (e.g. a X, Y or Z channel) from a second downmix channel signal (e.g. a W channel), to provide a first predicted channel signal. The first predicted channel signal may be subtracted from the first downmix channel signal 203 (or other way around) to provide a first compacted channel signal 404.

Predicting a first downmix channel signal 203 from a second downmix channel signal 203 may comprise determining a scaling factor for scaling the second downmix channel signal 203. The scaling factor may be determined such that the energy of the first compacted channel signal 404 is reduced compared to the energy of the first downmix channel signal 203 and/or such that the energy of the first compacted channel signal 404 is minimized. The first predicted channel signal may then correspond to the second downmix channel signal 203 scaled according to the scaling factor. For different channels different scaling factors may be determined.

In particular (in case of a first order ambisonics signal), performing 702 energy compaction may comprise predicting an X channel signal, a Y channel signal and a Z channel signal from a W channel signal of the plurality of downmix channel signals 203, to provide a predicted X channel signal, a predicted Y channel signal and a predicted Z channel signal, respectively. The predicted X channel signal may be subtracted from the X channel signal (or other way around) to determine a X' channel signal of the plurality of compacted channel signals 404. The predicted Y channel signal may be subtracted from the Y channel signal (or other way around) to determine a Y' channel signal of the plurality of compacted channel signals 404. The predicted Z channel signal may be subtracted from the Z channel signal (or other way around) to determine a Z' channel signal of the plurality of compacted channel signals 404. Furthermore, the W channel signal of the plurality of downmix channel signals 203 may be used as the W channel signal of the plurality of compacted channel signals 404.

As a result of this, the energy of all channels (apart from one, i.e. the W channel) may be reduced, thereby enabling an efficient encoding of the plurality of compacted channel signals 404.

The method 700 may further comprise determining 703 joint coding metadata (also referred to herein as SPAR metadata) 205 based on the plurality of compacted channel signals 404 and based on the multi-channel input signal 201. The joint coding metadata 205 may be determined such that the joint coding metadata 205 allows upmixing of the plurality of compacted channel signals 404 to an approximation of the multi-channel input signal 201. By making use of the plurality of compacted channel signals 404 for determined the joint coding metadata, the process of inverting energy compaction is automatically included into the joint coding metadata 205 (without the need for providing additional metadata specifically for inverting the energy compaction operation).

The joint coding metadata 205 may comprise upmix data, notably one or more upmix matrices, enabling the upmix of the plurality of compacted channel signals 404 to the approximation of the multi-channel input signal 201. The approximation of the multi-channel input signal 201 comprises the same number of channels as the multi-channel input signal 201. Furthermore, the joint coding metadata 205 may comprise decorrelation data enabling the reconstruction of a covariance of the multi-channel input signal 201.

The joint coding metadata 205 may be determined for a plurality of different subbands of the multi-channel input signal 201 (e.g. for 10 or more subbands, notably within the QMF domain). By providing joint coding metadata 205 for different subbands (i.e. within different frequency bands), a precise upmixing operation may be performed.

In addition, the method 700 comprises encoding 704 the plurality of compacted channel signals 404 and the joint coding metadata 205 (also known as SPAR metadata). Encoding 704 the plurality of compacted channel signals 404 may comprise performing waveform encoding (notably EVS encoding) of each one of the plurality of compacted channel signals 404, notably using a mono encoder for each compacted channel signal 404. Alternatively, or in addition, the joint coding metadata 205 may be encoded using an entropy encoder. As indicated above, the multi-channel input signal 201 may comprise one or more object signals of one or more audio objects 303. In such cases, the method 700 may comprise encoding, notably using an entropy encoder, the object metadata 202 for the one or more audio objects 303.

The method 700 allows a multi-channel input signal 201 which may be indicative of an SR signal and/or of one or more audio object signals to be encoded in a bit-rate efficient manner, while enabling a decoder to reconstruct the multi-channel input signal 201 at high perceptual quality.

Determining the joint coding metadata 205 based on the plurality of compacted channel signals 404 and based on the multi-channel input signal 201 may correspond to a first mode for encoding the multi-channel input signal 201.

Alternatively, or in addition to using prediction, performing 702 energy compaction may comprise applying a Karhonen-Loeve-Transform, a Principle Components Analysis transform and/or a Singular Value Decomposition transform to at least some of the plurality of downmix channel signals 203. By doing this, the coding efficiency of the plurality of compacted channel signals 404 may be increased further.

In particular, a Karhonen-Loeve-Transform, a Principle Components Analysis transform and/or a Singular Value Decomposition transform may be applied to compacted channel signals 404 which correspond to prediction residuals that have been derived based on a second downmix channel signal 203 (notably based on the W channel signal). In other words, a Karhonen-Loeve-Transform, a Principle Components Analysis transform and/or a Singular Value Decomposition transform may be applied to the prediction residuals.

As indicated above, in the context of prediction an X' channel signal, a Y' channel signal and a Z' channel signal may be derived based on the W channel signal of a plurality of downmix channel signals 203 forming an ambisonics signal. In particular, the X' channel signal may correspond to the X channel signal minus a prediction of the X channel signal, which is based on the W channel signal. In the same manner, the Y' channel signal may correspond to the Y channel signal minus a prediction of the Y channel signal, which is based on the W channel signal. In the same manner, the Z' channel signal may correspond to the Z channel signal minus a prediction of the Z channel signal, which is based on the W channel signal. The plurality of compacted channel signals 404 may be determined based on or may correspond to the W channel signal, the X' channel signal, the Y' channel signal and the Z' channel signal.

In order to further increase the coding efficiency of the plurality of compacted channel signals 404 a Karhonen-Loeve-Transform, a Principle Components Analysis transform and/or a Singular Value Decomposition transform may be applied to the X' channel signal, the Y' channel signal and the Z' channel signal to provide a X" channel signal, a Y" channel signal and a Z" channel signal. The plurality of compacted channel signals 404 may then be determined based on the W channel signal, the X" channel signal, the Y" channel signal and the Z" channel signal.

In a second mode, the joint coding metadata 205 may be determined based on the plurality of compacted channel signals 404 and based on the plurality of downmix channel signals 203. The joint coding metadata 205 may be determined such that the joint coding metadata 205 allows reconstructing the plurality of downmix channel signals 203 from the plurality of compacted channel signals 404. In particular, the joint coding metadata 205 may be determined such that the joint coding metadata 205 (only) reverts or inverts the energy compaction operation (without performing an upmixing operation). The second mode may be used for reducing the bit-rate (at a reduced perceptual quality).

As indicated above, the multi-channel input signal 201 may comprise an SR signal and one or more object signals. The first mode and the second mode may allow reconstruction of an SR signal (based on the plurality of compacted channel signals 404). Hence, the overall listening experience of a listener may be maintained (even when using the second mode).

The multi-channel input signal 201 may comprise a sequence of frames. The processing described in the present document may be performed frame-wise for each frame of the sequence of frames. In particular, the method 700 may comprise determining for each frame of the sequence of frames whether to use the first mode or the second mode. By doing this, encoding may be adapted to changing conditions of a transmission network in a rapid manner.

The method 700 may comprise generating a bitstream 101 based on coded audio data 206 derived by encoding 704 the plurality of compacted channel signals 404 and based on coded metadata 207 derived by encoding 704 the joint coding metadata 205. Furthermore, the method 700 may comprise inserting an indication into the bitstream 101, which indicates whether the second mode or the first mode has been used. The indication may be inserted on a frame-by-frame basis. As a result of this, a corresponding decoding unit 350 is enabled to adapt decoding in a reliable manner.

Figure 8:
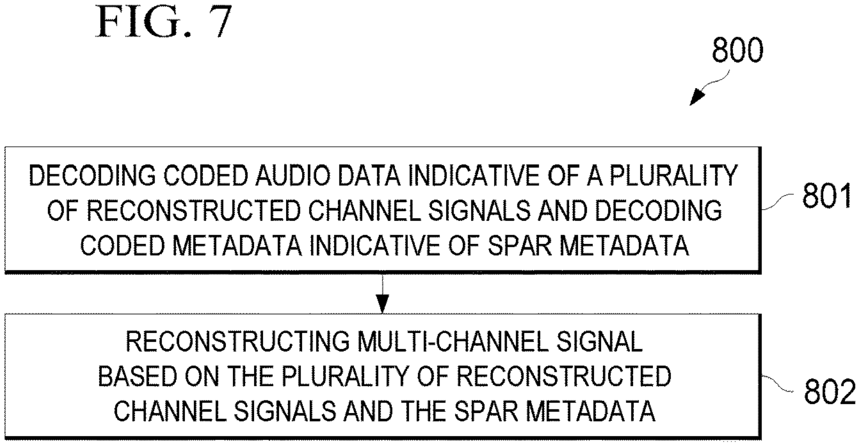
FIG. 8 shows a flow chart of an example method for decoding data indicative of an immersive audio signal.

FIG. 8 shows a flow chart of an example method 800 for determining a reconstructed multi-channel signal 311 from coded audio data 206 indicative of a plurality of reconstructed channel signals 314 and from coded metadata 207 indicative of joint coding metadata 205. The method 800 may comprise extracting the coded audio data 206 and the coded metadata 207 from a bitstream 101.

Furthermore, the method 800 may comprise decoding 801 the coded audio data 206 to provide the plurality of reconstructed channel signals 314 and decoding the coded metadata 207 to provide the joint coding metadata 205. In a preferred example, the plurality of reconstructed channel signals 203 forms a first order ambisonics signal, notably in a B-format or in an A-format.

Decoding 801 of the coded audio data 206 may comprise waveform decoding of each one of the plurality of reconstructed channel signals 314, notably using a mono decoder (e.g. an EVS decoder) for each reconstructed channel signal 314. The coded metadata 207 may be decoded using an entropy decoder.

Furthermore, the method 800 comprises determining 802 the reconstructed multi-channel signal 311 from the plurality of reconstructed channel signals 314 using the joint coding metadata 205, wherein the reconstructed multi-channel signal 311 may comprise a reconstructed soundfield representation (SR) signal. In particular, the reconstructed multi-channel signal 311 corresponds to an approximation or a reconstruction of the multi-channel input signal 201. The reconstructed multi-channel signal 311 and the object metadata 202 may together form a reconstructed immersive audio (IA) signal 121.

In addition, the method 800 may comprise rendering the reconstructed multi-channel signal 311 (typically in conjunction with the object metadata 202). Rendering may be performed using headphone rending, speaker rendering and/or soundfield rendering. As a result of this, flexible rending of spatial audio content is enabled (notably for VR applications).

As indicated above, the joint coding metadata 205 may comprise upmix data, notably one or more upmix matrices, enabling the upmix of the plurality of reconstructed channel signals 404 to the reconstructed multi-channel signal 311. Furthermore, the joint coding metadata 205 may comprise decorrelation data enabling the generation of a reconstructed multi-channel signal 311 having a pre-determined covariance. The joint coding metadata 205 may comprise different metadata for different subbands of the reconstructed multi-channel signal 311. As a result of this, a precise reconstruction of the multi-channel input signal 201 may be achieved.

At the corresponding encoder 200 energy compaction may have been applied to the plurality of downmix channel signals 304. Energy compaction may have been performed using prediction and/or using a Karhonen-Loeve-Transform, a Principle Components Analysis transform and/or a Singular Value Decomposition transform. The joint coding metadata 205 may be such that, in addition to the upmixing, it implicitly performs an inverse of the energy compaction operation. In particular, the joint coding metadata 205 may be such that in addition it implicitly performs an inverse of the prediction operation and/or an inverse of the Karhonen-Loeve-Transform, the Principle Components Analysis transform and/or the Singular Value Decomposition transform.

In other words, the joint coding metadata 205 may be configured to enable the upmix of the plurality of reconstructed channel signals 404 to the reconstructed multi-channel signal 311 and (implicitly) to perform an inverse energy compaction operation on the plurality of reconstructed channel signals 314. In particular, the joint coding metadata 205 may be configured to (implicitly) perform an inverse prediction operation (inverse to the prediction operation performed by the encoder 200) on at least some of the plurality of reconstructed channel signals 314. Alternatively, or in addition, the joint coding metadata 205 may be configured to perform an inverse of a Karhonen-Loeve-Transform, a Principle Components Analysis transform and/or a Singular Value Decomposition transform (inverse to the transform performed by the encoder 200) on at least some of the plurality of reconstructed channel signals 314. As a result of this, a particularly efficient coding scheme may be provided.

The reconstructed multi-channel signal 311 may comprise one or more reconstructed object signals of one or more audio objects 303 (in addition to the SR signal, e.g. a FOA or a HOA signal). The method 800 may comprise decoding, notably using an entropy decoder, object metadata 202 for the one or more audio objects 303 from the coded metadata 207. As a result of this, the one or more objects 303 may be rendered in a precise manner.

As indicated above, the plurality of reconstructed channel signals 314 may form an SR signal, notably a $K^{th}$ order ambisonics signal, with K≥1 (notably K=1). On the other hand, the reconstructed multi-channel signal 311 may comprise the reconstructed SR signal, notably an $L^{th}$ order ambisonics signal, with L≥K (notably L=K or L=K+1), and one or more (e.g. n=2) reconstructed object signals of one or more audio objects 303. The reconstructed multi-channel signal 311 may be determined by upmixing the plurality of reconstructed channel signals 314 using the joint coding metadata 205, thereby providing a reconstructed multi-channel signal 311 with substantial spatial acoustic events.

As indicated above, the use of upmixing may correspond to a first mode (for high perceptual quality). In the first mode, the joint object metadata 205 comprises upmix data for enabling the upmix operation. In the second mode, the reconstructed multi-channel signal 311 may comprise the same number of channels as the plurality of reconstructed channel signals 314 (such that no upmix operation is required).

In the second mode, the joint coding metadata 205 may comprise prediction data (e.g. one or more scaling factors) configured to redistribute energy among the different reconstructed channel signals 314. Furthermore, in the second mode, determining 802 the reconstructed multi-channel signal 311 may comprise redistributing energy among the different reconstructed channel signals 314 using the prediction data. In particular, the inverse of the above mentioned energy compaction operation may be performed using the joint coding metadata 205. As a result of this, the plurality of downmix channel signals 203 may be reconstructed in an efficient and precise manner.

As outlined above, the energy compaction operation that is performed during encoding may comprise applying a Karhonen-Loeve-Transform, a Principle Components Analysis transform and/or a Singular Value Decomposition transform to at least some of the plurality of downmix channel signals 203. The joint coding metadata 205 may comprise transform data which enables a decoder 350 to perform the inverse of the Karhonen-Loeve-Transform, the Principle Components Analysis transform and/or the Singular Value Decomposition transform. In other words, the transform data is indicative of an inverse of a Karhonen-Loeve-Transform, a Principle Components Analysis transform and/or a Singular Value Decomposition transform, which is to be applied to at least some of the plurality of reconstructed channel signals 314 for determining the reconstructed multi-channel signal 311. As a result of this, the plurality of downmix channel signals 203 may be reconstructed in an efficient and precise manner.

As indicated above, the reconstructed multi-channel input signal 311 may comprise a sequence of frames. The method 800 may comprise determining for each frame of the sequence of frames whether or not the second mode is to be used. For this purpose, an indication may be extracted from the bitstream 101, which indicates whether the second mode is to be used.

Various example embodiments of the present invention may be implemented in hardware or special purpose circuits, software, logic or any combination thereof. Some aspects may be implemented in hardware, while other aspects may be implemented in firmware or software, which may be executed by a controller, microprocessor or other computing device. In general, the present disclosure is understood to also encompass an apparatus suitable for performing the methods described above, for example an apparatus (spatial renderer) having a memory and a processor coupled to the memory, wherein the processor is configured to execute instructions and to perform methods according to embodiments of the disclosure.

While various aspects of the example embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller, or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present invention include a computer program product comprising a computer program tangibly embodied on a machine-readable medium, in which the computer program containing program codes configured to carry out the methods as described above.

In the context of the disclosure, a machine-readable medium may be any tangible medium that may contain, or store, a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention, or of what may be claimed, but rather as descriptions of features that may be specific to particular embodiments of particular inventions. Certain features that are described in this specification in the context of separate embodiments may also may be implemented in combination in a single embodiment. Conversely, various features that are described in the context of a single embodiment may also may be implemented in multiple embodiments separately or in any suitable sub-combination.

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for determining a reconstructed multi-channel signal from coded audio data indicative of a plurality of reconstructed channel signals and from coded metadata indicative of joint coding metadata, the method comprising:

decoding the coded audio data to provide the plurality of reconstructed channel signals forming a $K^{th}$ order Ambisonics signal, with $K \geq 1$, and decoding the coded metadata to provide the joint coding metadata; and upmixing the plurality of reconstructed channel signals to an increased number of first upmixed channel signals based on the joint coding metadata, the first upmixed channel signals including an $L^{th}$ order Ambisonics signal, with $L > K$;

applying decorrelation to a selected channel of the $K^{th}$ order Ambisonics signal to generate first and second decorrelated signals;

upmixing the first and second decorrelated signals to the increased number of second upmixed channel signals based on the joint coding metadata; and determining the reconstructed multi-channel signal by summing corresponding channels of the $L^{th}$ order Ambisonics signal and the second upmixed channel signals.

* * * * *